US006778989B2

United States Patent
Bates et al.

(10) Patent No.: US 6,778,989 B2
(45) Date of Patent: Aug. 17, 2004

(54) SYSTEM AND METHOD FOR CONSTRUCTING AND VIEWING AN ELECTRONIC DOCUMENT

(75) Inventors: Cary Lee Bates, Rochester, MN (US); Robert James Crenshaw, Apex, NC (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 09/898,560

(22) Filed: Jul. 3, 2001

(65) Prior Publication Data

US 2003/0009460 A1 Jan. 9, 2003

(51) Int. Cl.[7] .............................................. G06F 17/30
(52) U.S. Cl. ................................ 707/10; 707/1; 707/3; 707/102
(58) Field of Search ............ 707/10, 1, 3; 709/200–206

(56) References Cited

U.S. PATENT DOCUMENTS

| 5,634,064 | A | | 5/1997 | Warnock et al. |
|---|---|---|---|---|
| 5,781,901 | A | * | 7/1998 | Kuzma ........................ 707/10 |
| 6,016,498 | A | | 1/2000 | Bakke et al. |
| 6,018,768 | A | | 1/2000 | Ullman et al. |
| 6,078,921 | A | | 6/2000 | Kelley |
| 6,094,655 | A | | 7/2000 | Rogers et al. |
| 6,098,085 | A | | 8/2000 | Blonder et al. |
| 6,470,338 | B1 | * | 10/2002 | Rizzo et al. .................... 707/6 |
| 6,470,383 | B1 | * | 10/2002 | Leshem et al. ............. 709/203 |
| 2002/0138582 | A1 | * | 9/2002 | Chandra et al. ............ 709/206 |

FOREIGN PATENT DOCUMENTS

| EP | 0827095 A1 | 3/1998 |
|---|---|---|
| JP | 08153104 A | 6/1996 |
| JP | 11-184789 | 7/1999 |

OTHER PUBLICATIONS

Wilfred J. Hansen, Enhancing documents with embedded programs: How Ness extends insets in the Andrew Toolket 1990, pp. 1–12.*
Hypermess, WWW–email–discuss, Oct. 1999, pp. (1–13).*

* cited by examiner

Primary Examiner—Jean M. Corrielus
Assistant Examiner—Cam-Y Truong
(74) Attorney, Agent, or Firm—Dillon & Yudell, LLP

(57) ABSTRACT

The electronic document composer stored in the memory and executable by the processor is utilized for drafting a first electronic document. A sender composes the first electronic document including at least a normal element, a conditional element, and a link element utilizing the electronic message composer. The sender can associate the conditional element with the link element, thus hiding the conditional element from view. The first electronic document is viewed utilizing the electronic document viewer. As the recipient invokes display of a remotely stored second electronic document by selecting an associated link element, the conditional element related to the associated link element will then become visible.

22 Claims, 15 Drawing Sheets

SYSTEM AND METHOD FOR CONSTRUCTING AND VIEWING AN ELECTRONIC DOCUMENT

BACKGROUND OF THE INVENTION

1. Technical Field

The present invention relates in general to data processing systems, and more particularly, communication between data processing systems. Still more particularly, the present invention relates to a system and method for communicating electronic documents between data processing systems.

2. Description of the Related Art

When using e-mail (electronic mail) to communicate, a user will typically construct a message using an e-mail application running on a computer (or other data processing system) that is or can be connected by a network to other computers. Typically, the user and the intended recipient(s) of the message each have an Internet e-mail address, which are included in the e-mail message. When the user has finished constructing the message, the user will "send" the message to the intended recipient(s). The message is then electronically transmitted via a computer network. Each recipient, also using an e-mail application running on a computer coupled to the computer network, can then receive and view the message.

A common computer network utilized to send and receive e-mail is the Internet. The Internet is a world-wide network of interlinked computer systems that all employ the transmission control protocol/Internet protocol (TCP/IP) protocol suite. The Internet provides for electronic file transfer, remote login, e-mail, news and other services. Users frequently interact with the Internet via the World Wide Web (WWW), which is a hypertext-based system for locating and accessing Internet resources. Hypertext refers to specific content elements within a document that include links to other documents. A user retrieves information from the Web by invoking a browser, a client program that runs on a client computer, which allows a user to display documents retrieved from the Web.

There are a number of ways that a user can connect to the Internet to send and receive e-mail. One common method is to establish a dial-up account with an Internet service provider (ISP). Using a computer with a modem, the user dials the access number of the ISP to establish a connection with a computer coupled to the Internet. The user can utilize an e-mail program (e.g., Eudora, Microsoft Outlook, or the ISP proprietary interface) to send and receive e-mail over the Internet. Other methods for connecting to the Internet include ethernet, cable modem, and satellite connections.

It has become increasingly common to create, transmit, and display documents, including e-mail messages, in electronic form. Electronic documents have a number of advantages over paper documents. These advantages include the ease of transmission, compact storage, and the ability of the sender and recipients to edit and/or electronically manipulate the message. However, because of the flexible nature of electronic media, it is often difficult to present information to a reader in a structured fashion.

For example, authors of e-mail messages often present related or supporting information by providing a hypertext link to a web site that includes further information on a topic being presented to the audience to better support the author's conclusions. However, there is no structured way to present the hypertext links in a document. Some readers may select the link(s) even before reading the accompanying explanatory text. Others may read the entire text and then may or may not select the hypertext link(s) supplied within the document. In each of these cases, the audience may be unable to understand the author's work because the audience does not consider the linked information in the proper context in relation to the content of the message.

SUMMARY OF THE INVENTION

To overcome the foregoing and additional limitations in the prior art, the present invention provides a data processing system and method for constructing and viewing an electronic document. In accordance with a preferred embodiment of the present invention, the data processing system includes a processor, a memory, an electronic document composer, and an electronic document viewer. Both the electronic document composer and the electronic document viewer are stored in the memory and executable by the processor.

The electronic document composer is utilized to construct a first electronic document including at least a normal element, a conditional element, and a link element. The link element is associated with a remotely stored second electronic document. The sender can also associate the conditional element with the link element.

The electronic document viewer is utilized to view electronic documents, such as the first electronic document. When a recipient initially invokes display of the first electronic document, only the normal and link elements are visible. As the recipient invokes display of a remotely stored second electronic document by selecting the link element, the conditional element related to the link element will then be displayed by the electronic document viewer.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
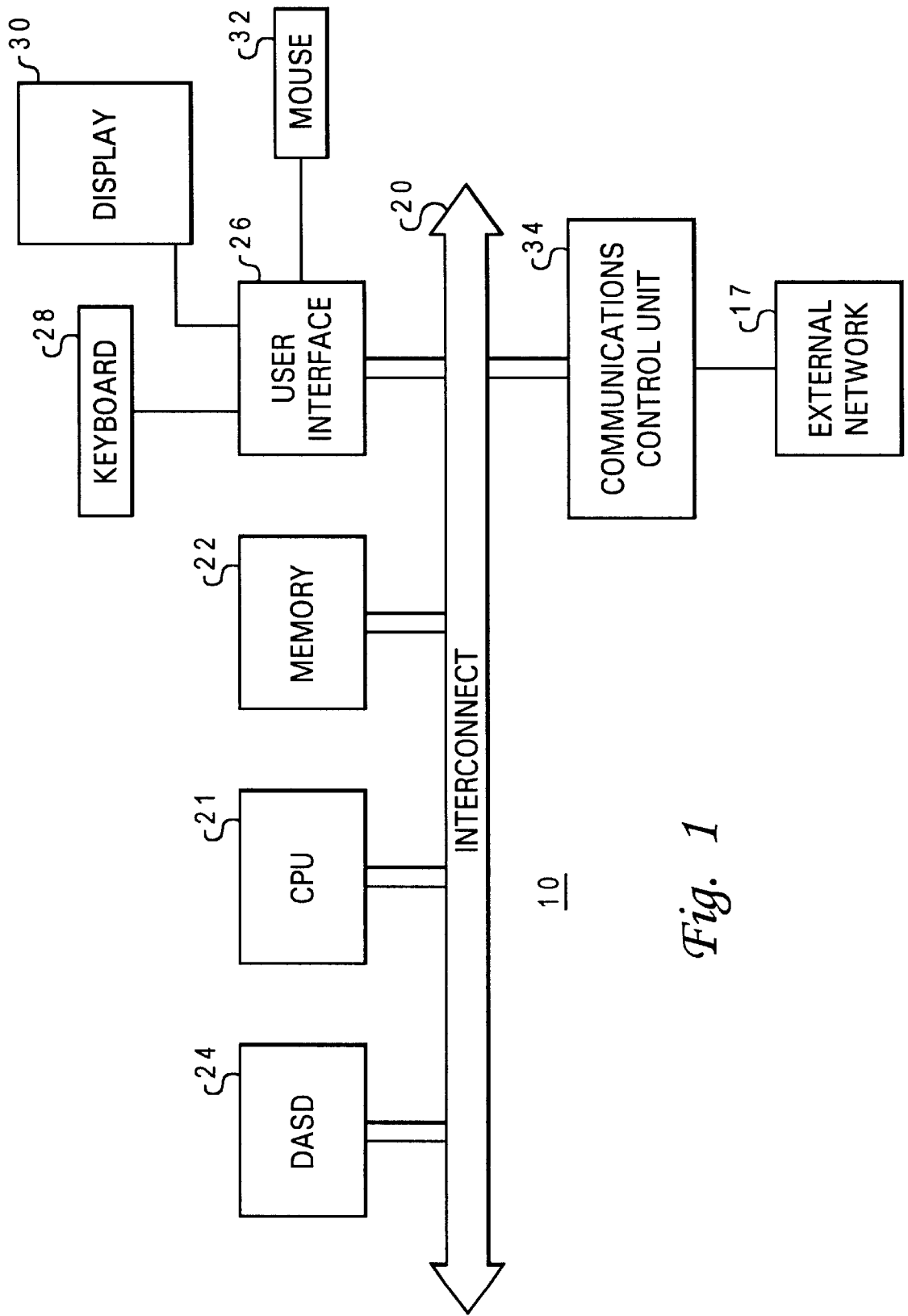
FIG. 1 depicts a block diagram of an exemplary data processing system, which may be utilized to implement the present invention.

With reference now to the figures and in particular with reference to FIG. 1, there is depicted a detailed block diagram of a data processing system 10 in which a preferred embodiment of the present invention may be implemented. As illustrated, data processing system 10 includes a CPU 21, memory 22, DASD 24, user interface 26 and communication control unit 34 coupled by a system interconnect 20. It should be readily apparent to those skilled in the art that system interconnect 20 may be implemented as a bus, a switch or any other type of coupling apparatus. Central processing unit (CPU) 21, which may be implemented as one or more processors, such as any generation of Pentium™ processor available from Intel Corporation in Santa Clara, Calif., executes software instructions to control the operation of data processing system 10.

Memory 22 provides storage for software and data and may include both read-only memory (ROM) and random access memory (RAM). Direct access storage device (DASD) 24 provides additional non-volatile storage for data processing system 10. DASD 24 may include, for example, a CD-ROM, a CD-RW, a DVD disk drive, a hard disk drive, and/or a floppy disk drive.

User interface 26 provides an interface between data processing system 10 and peripherals employed by a user to interact with data processing system 10. User interface 26 may include various adapters and drivers for controlling peripherals, such as keyboard 28, display 30, and mouse 32. Communications control unit 34 provides an interface between data processing system 10 and an external network 17, which may be a local area network (LAN) or a wide area network (WAN) such as the Internet.

Figure 2:
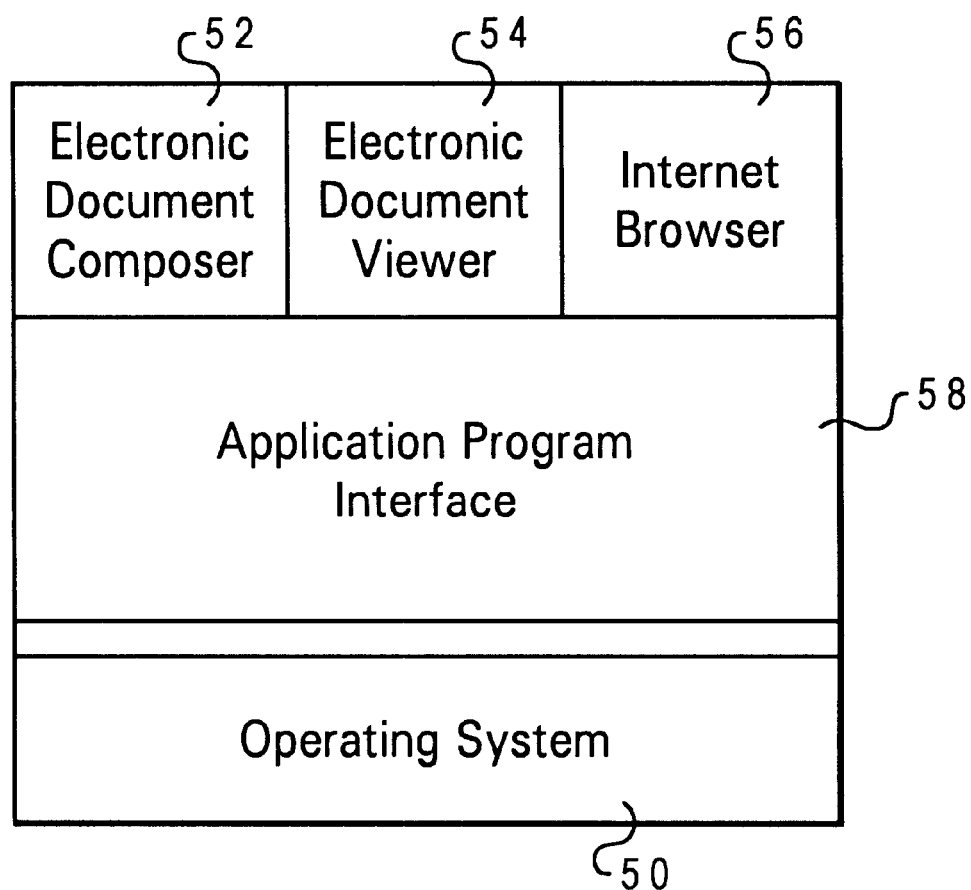
FIG. 2 illustrates a layer diagram of the software utilized to implement a preferred embodiment of the present invention.

Referring now to FIG. 2, a software layer diagram is illustrated. As well known in the art, a data processing system requires a set of program instructions, known as an operating system, to function properly. Basic functions (e.g., saving data to a memory device or controlling the input and output of data by the user) are handled by operating system 50, which may be at least partially stored in memory 22 and/or DASD 24 of data processing system 10. A set of application programs for user functions (e.g., e-mail programs, word processors, Internet browsers), runs on top of operating system 50. As shown, electronic document composer 52, electronic document viewer 54, and Internet browser 56 access the functionality of operating system 50 via an application program interface 58.

Figure 3:
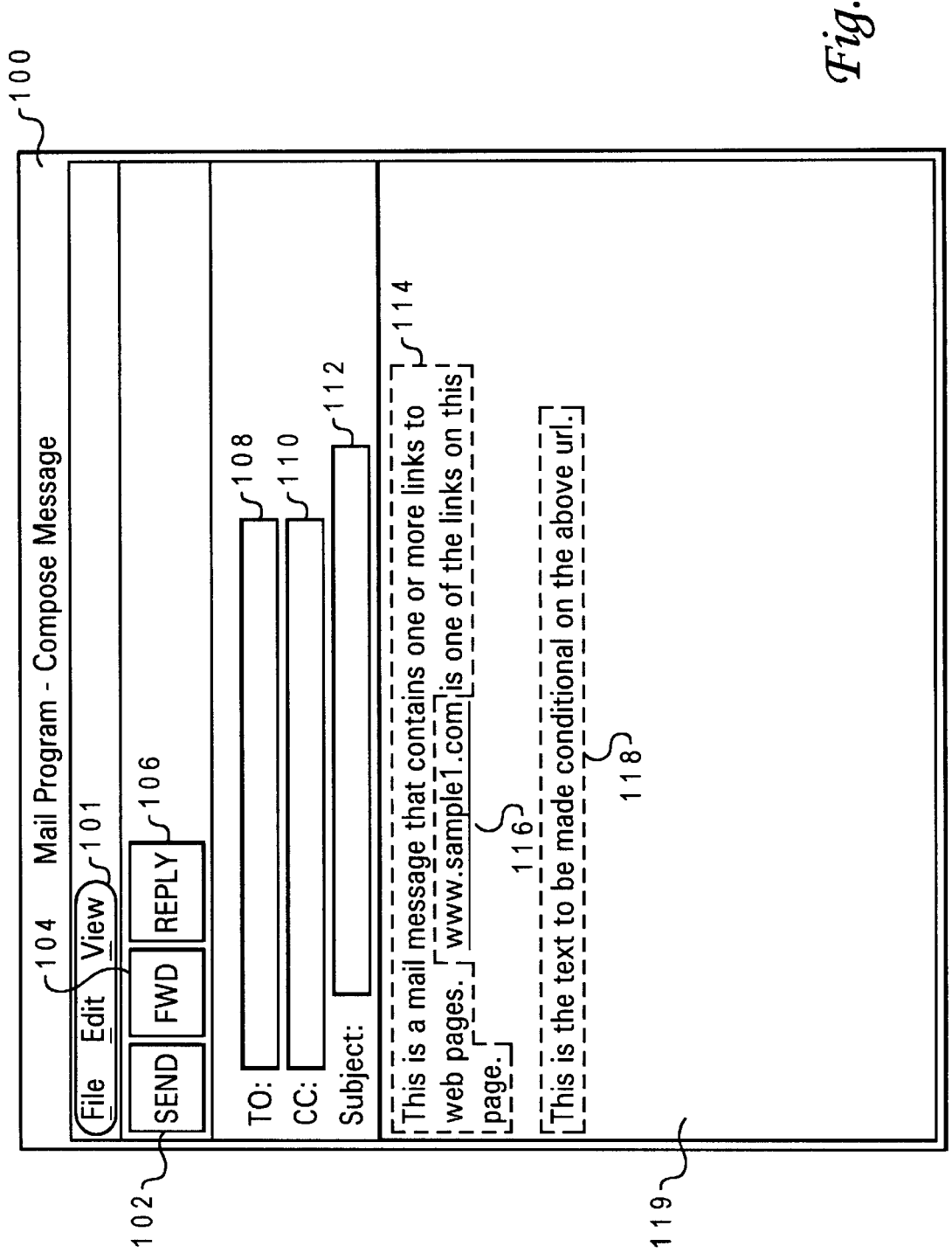
FIG. 3 illustrates a graphical user interface (GUI) of an electronic document composer in accordance with a preferred embodiment of the present invention.

With reference to FIG. 3, there is depicted a graphical user interface (GUI) of an electronic document composer 52, herein referred to as "electronic document composer interface 100," which may be displayed with display 30 of data processing system 10. As illustrated, electronic document composer interface 100 provides a set of pull-down menus 101, a toolbar containing buttons 102–106, and a number of text fields 108, 110, 112, and 119. As is well-known to those skilled in the art, a user can select pull-down menus 101 or buttons 102–106 and enter text in fields 108–112 and 119 utilizing keyboard 28 and mouse 32. Buttons 102, 104, and 106 provide the sender with easy access to commonly used functions. For example, a user selects "send" button 102 to send a message, herein referred to as a first electronic document, to at least one recipient. The selection of a "forward" button 104 causes electronic document composer 52 to relay a received message to at least one other user. Finally, if a user presses a "reply" button 106 using mouse 32, the sender can construct and send a reply to a received message. In each case, the user (also referred to as the sender) specify a subject in subject field 112 and can enter message elements within message field 119, as explained below According to a preferred embodiment of the present invention, there are three types of user-entered elements included in the first electronic document. The first type is a normal element 114. This first element type has no associated special features. The second element type is designated as a link element 116, which is associated with a remotely stored second electronic document. The remotely stored second electronic document may be a hypertext or extensible markup language (HTML or XML) document, also referred to as a "web page," stored in a remote or local web server coupled to the World Wide Web (WWW) of the Internet. Link element 116 is often implemented as an uniform resource locator (URL). The third element type is a conditional element 118. Conditional element 118 is hidden from view when a recipient initially invokes display of the first electronic document. Conditional element 118 is related to link element 116 such that conditional element 118 is made viewable in the first electronic document when the recipient invokes display of the remotely stored electronic document associated with link element 116.

Figure 4:
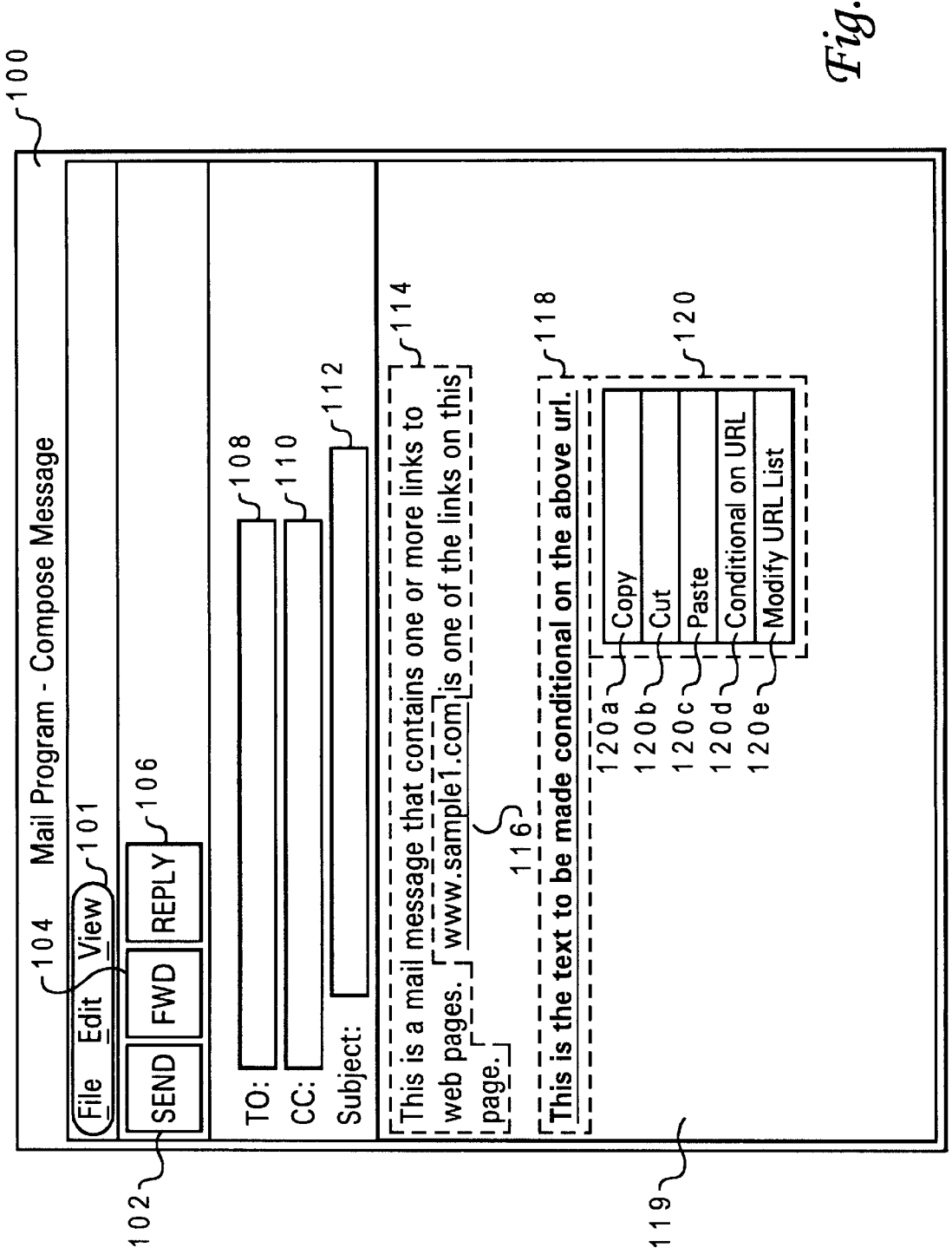
FIG. 4 depicts a GUI of an electronic document composer that displays a first electronic document having at least a normal element, a conditional element, and a link element in accordance with a preferred embodiment of the present invention.

Now referring to FIG. 4, there is depicted another view of electronic document composer interface 100 in which the user designates element 118 as a conditional element; for example, by selecting conditional element 118 utilizing the right button of mouse 32. As illustrated in FIG. 4, in response to selection of conditional element 118 electronic document composer 52 displays dialog box 120. Within dialog box 120 are several options for the message sender, including a "copy" option 120a, a "cut" option 120b, a "paste" option 120c, or a "set conditional on URL" option 120d, and a "modify URL list" option 120e, which is explained below in more detail. By selecting "set conditional on URL" option 120d, the user designates element 118 as a conditional element.

Figure 5:
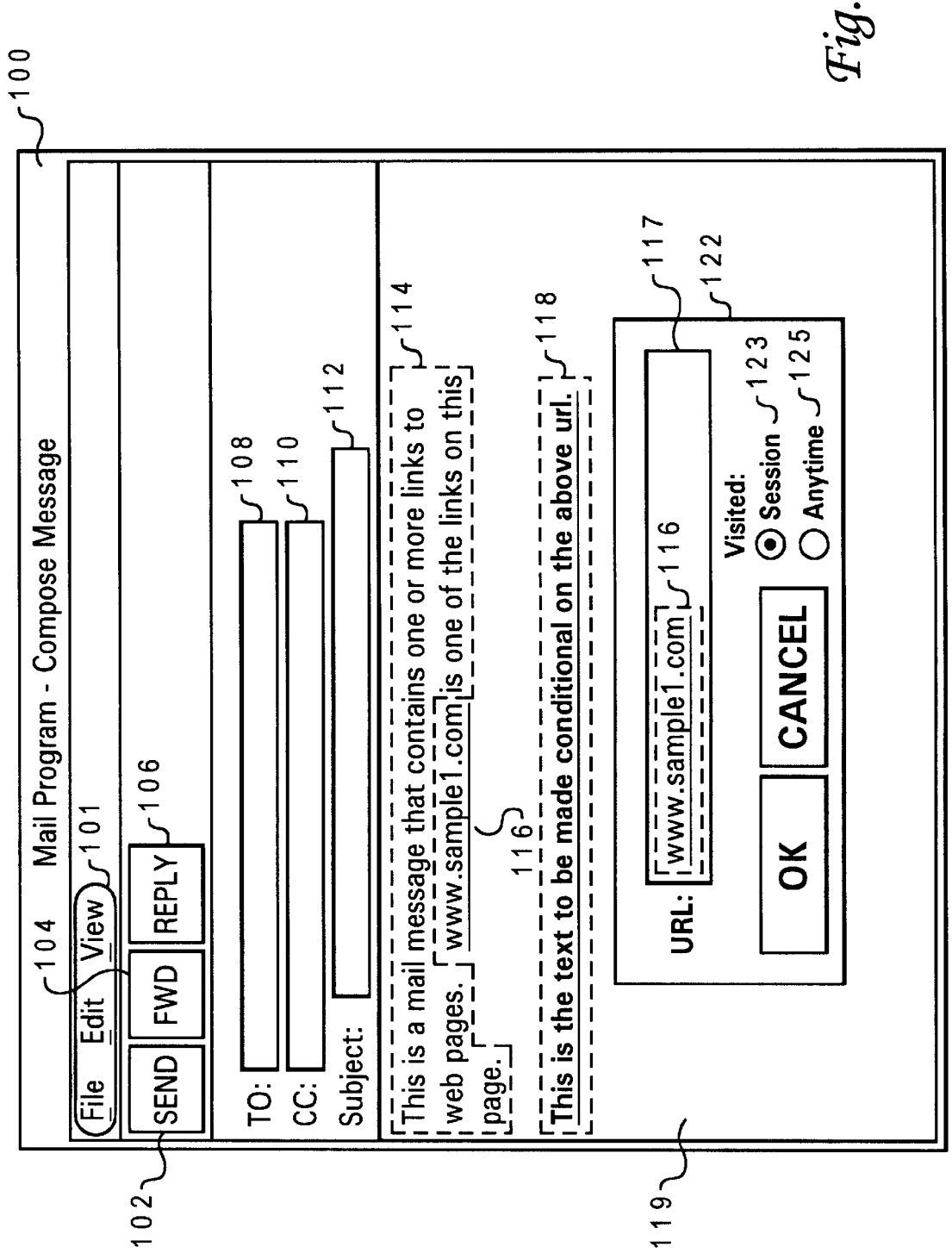
FIG. 5 illustrates a GUI of an electronic document composer that includes a dialog box for associating a link element with a conditional element in accordance with a preferred embodiment of the present invention.

With reference to FIG. 5, another view of an electronic document composer interface 100 is illustrated in which the sender utilizes URL dialog box 122 to associate conditional element 118 with link element 116. The user enters link element 116, which identifies a remotely stored electronic document, in URL field 117. If the sender selects a "session" option, a process is followed each time the recipient invokes display of the first electronic document. This process includes hiding conditional element 118 from the recipient until the recipient selects link element 116 to invoke display of the remotely stored second electronic document. If the sender selects an "anytime" option, a different process, explained below in more detail, is followed.

Figure 6:
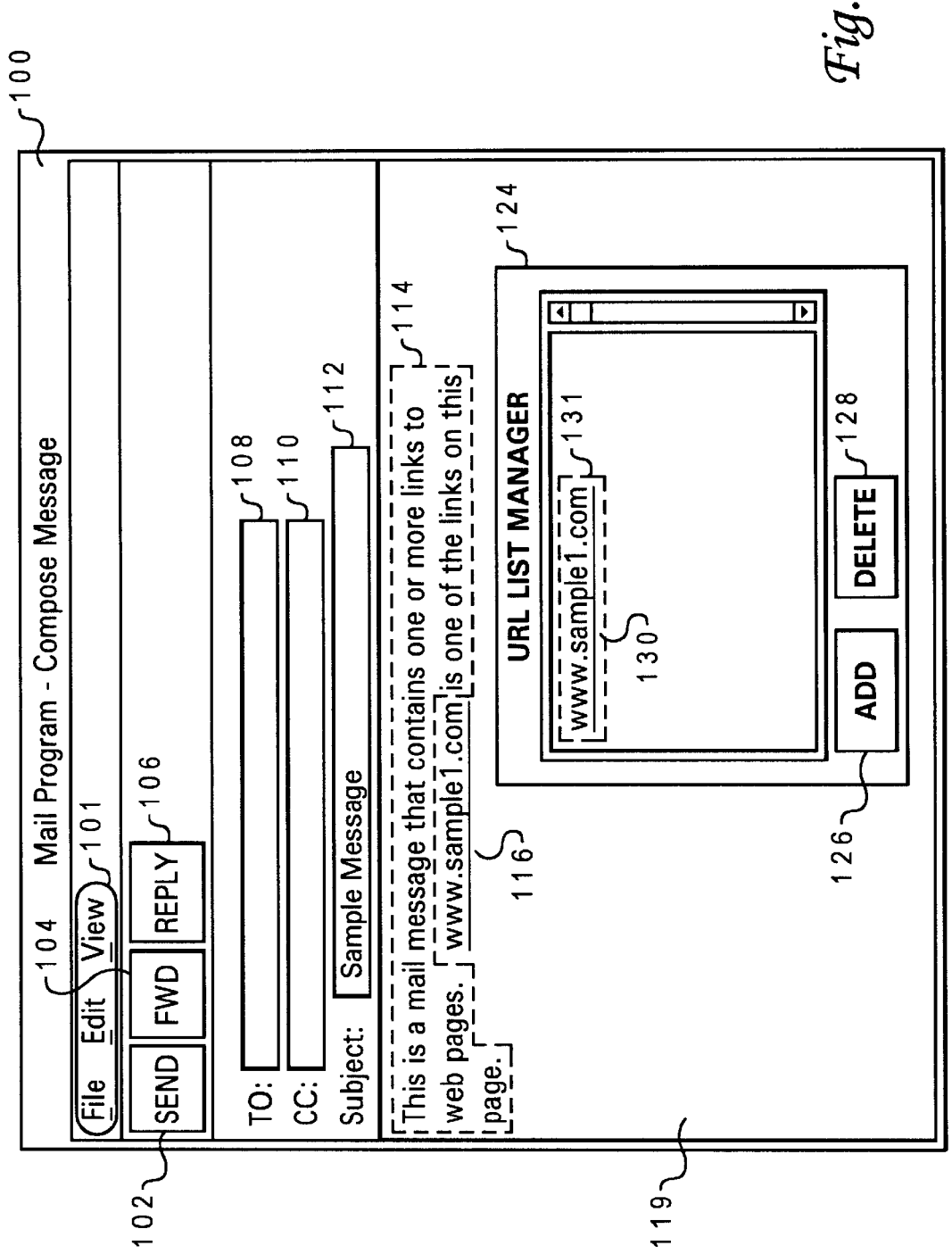
FIG. 6 illustrates a GUI of an electronic document composer that includes a uniform resource locator (URL) list manager for adding or removing at least one link element associated with a remotely stored second electronic document in accordance with a preferred embodiment of the present invention.

With reference to FIG. 6, there is depicted another view of an electronic document composer interface 100 including an URL list manager 124, which allows the sender to easily edit an associated link elements list 131. URL list manager 124 is displayed when the sender selects the "Modify URL list" option, as illustrated in FIG. 4. The interface of URL list manager 124 enables the sender to quickly add or remove link elements. Link elements may be removed by pressing "delete" button 128 on a selected link element 130. To add a new link element, the sender may press "add" button 126 and enter the new link element to be associated with conditional element 116.

Figure 7:
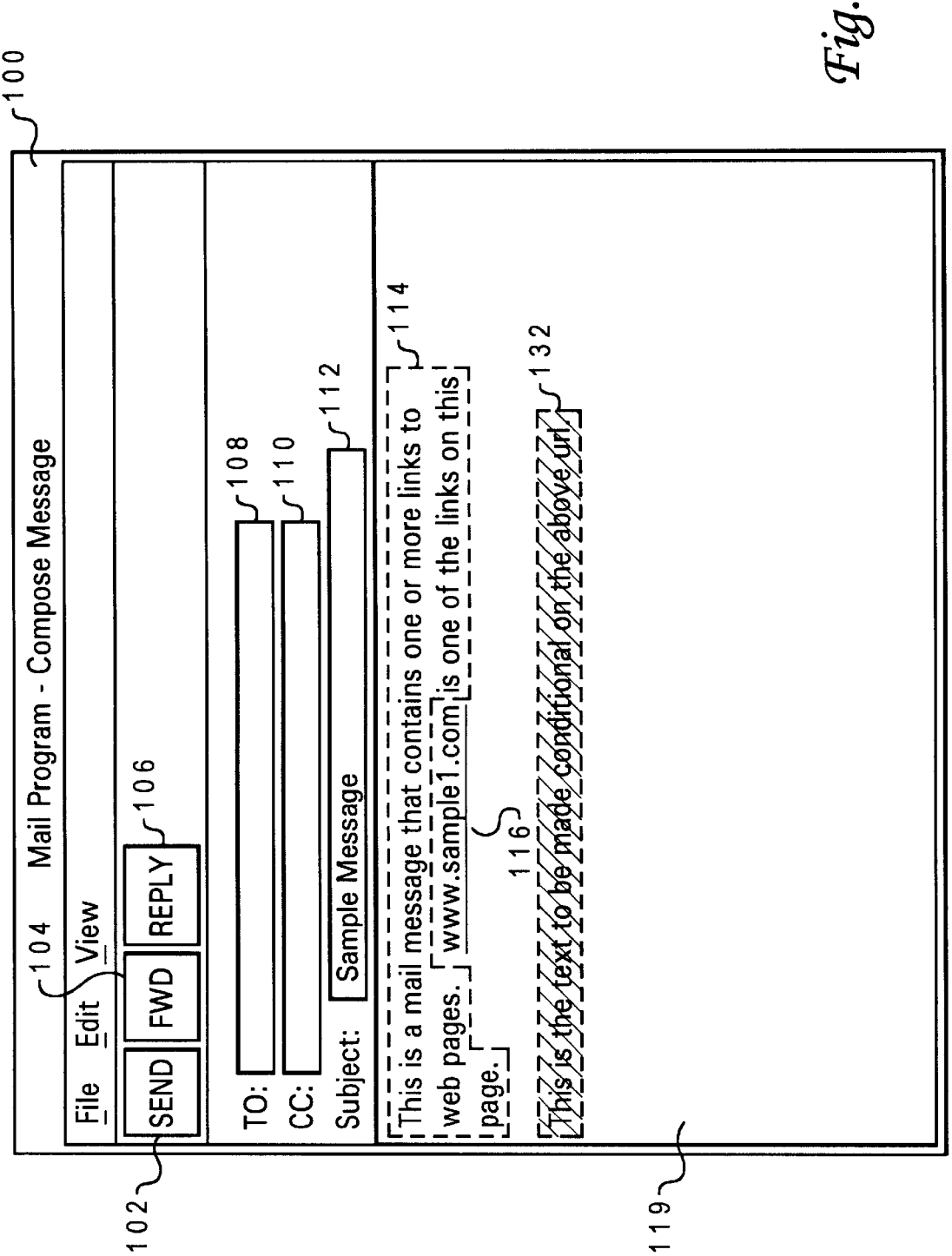
FIG. 7 depicts a GUI of an electronic document composer that includes a first electronic document including at least one normal element, at least one link element, and a placeholder that represents a hidden conditional element in accordance with a preferred embodiment of the present invention.

Referring to FIG. 7, there is illustrated another view of an electronic document composer interface 100 before the first electronic document is sent to at least one intended recipient. Since conditional element 118 has been associated with link element 116, conditional element 118 is represented by a placeholder 132 in message field 119 included in electronic document composer interface 100. Placeholder 132 alerts the sender to elements that will be initially hidden to the recipient by displaying a hatched pattern over those elements.

Figure 8:
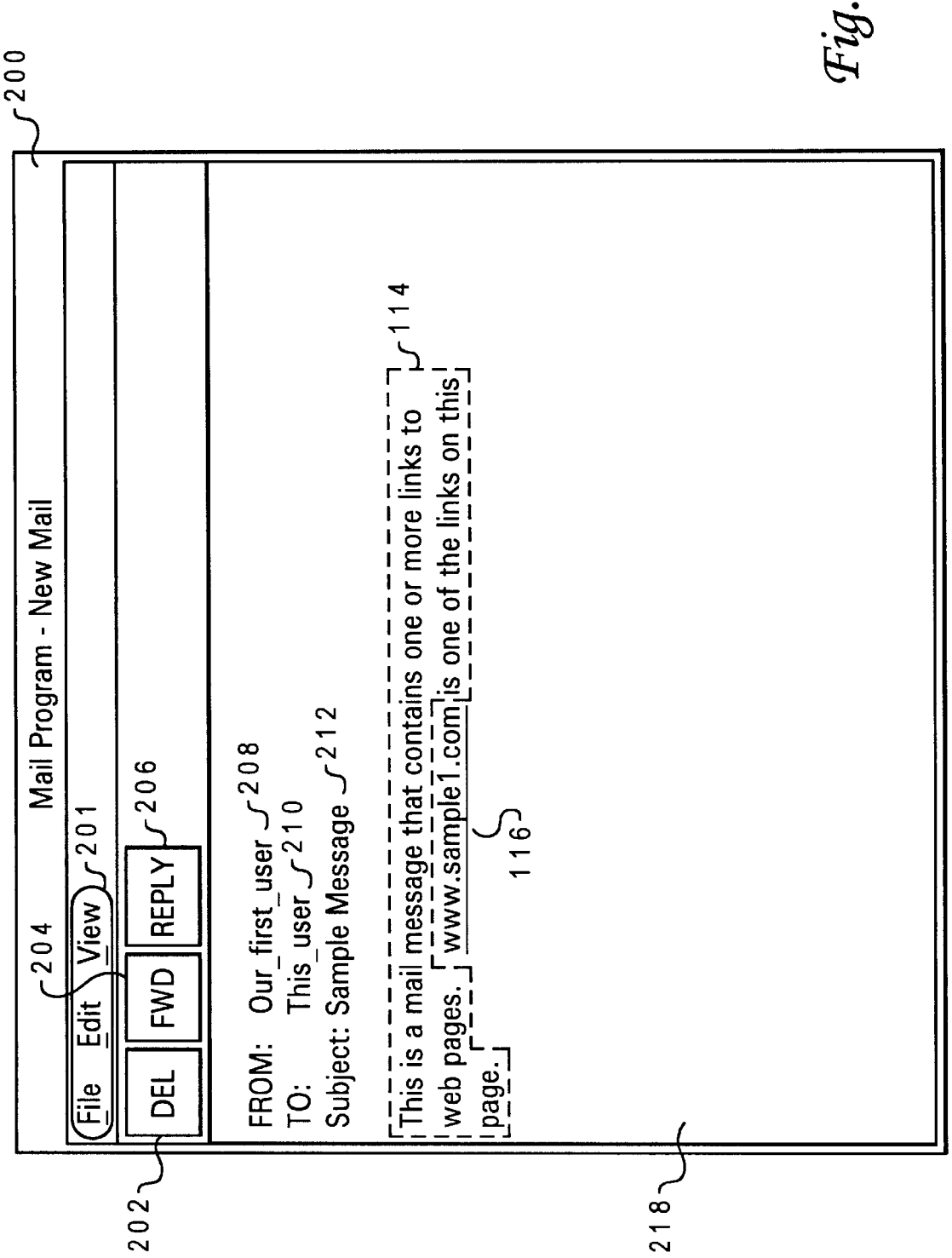
FIG. 8 depicts a GUI of an electronic document viewer that displays the first electronic document as viewed by a recipient when the recipient initially invokes display of the first electronic document in accordance with a preferred embodiment of the present invention.

With reference to FIG. 8, a preferred embodiment of a GUI of electronic document viewer 54, herein referred to as "electronic document viewer interface 200," in accordance to the present invention, is illustrated. As illustrated electronic document viewer interface 200 provides a set of pull-down menus 201, a toolbar containing buttons 202–206, and a number of text fields 208, 210, 212, and 218. As is well-known to those skilled in the art, a user can select pull-down menus 201 or buttons 202–206 utilizing keyboard 28 and mouse 32. Buttons 202, 204, and 206 provide the user with easy access to commonly used functions. For example, a user selects "Delete" button 202 to remove the first electronic document from memory 22. The utilization of "forward" button 204 causes electronic document viewer 54 to forward a received message to at least one other user. Finally, if the recipient presses "reply" button 206 using mouse 32, the recipient can construct and send a reply to a received message. Multiple fields 208, 210, and 212 identify a set of information concerning the received message. A first address 208 identifies the sender while a second address 210 designates the intended recipient of the first electronic document. Subject field 212 presents the subject matter of the first electronic document. Message field 218 includes the elements of the received message as viewed by the recipient. No conditional elements are displayed within message field 218 because the recipient has not yet invoked display of a remotely stored second electronic document associated to the conditional element by selecting link element 116.

Figure 9:
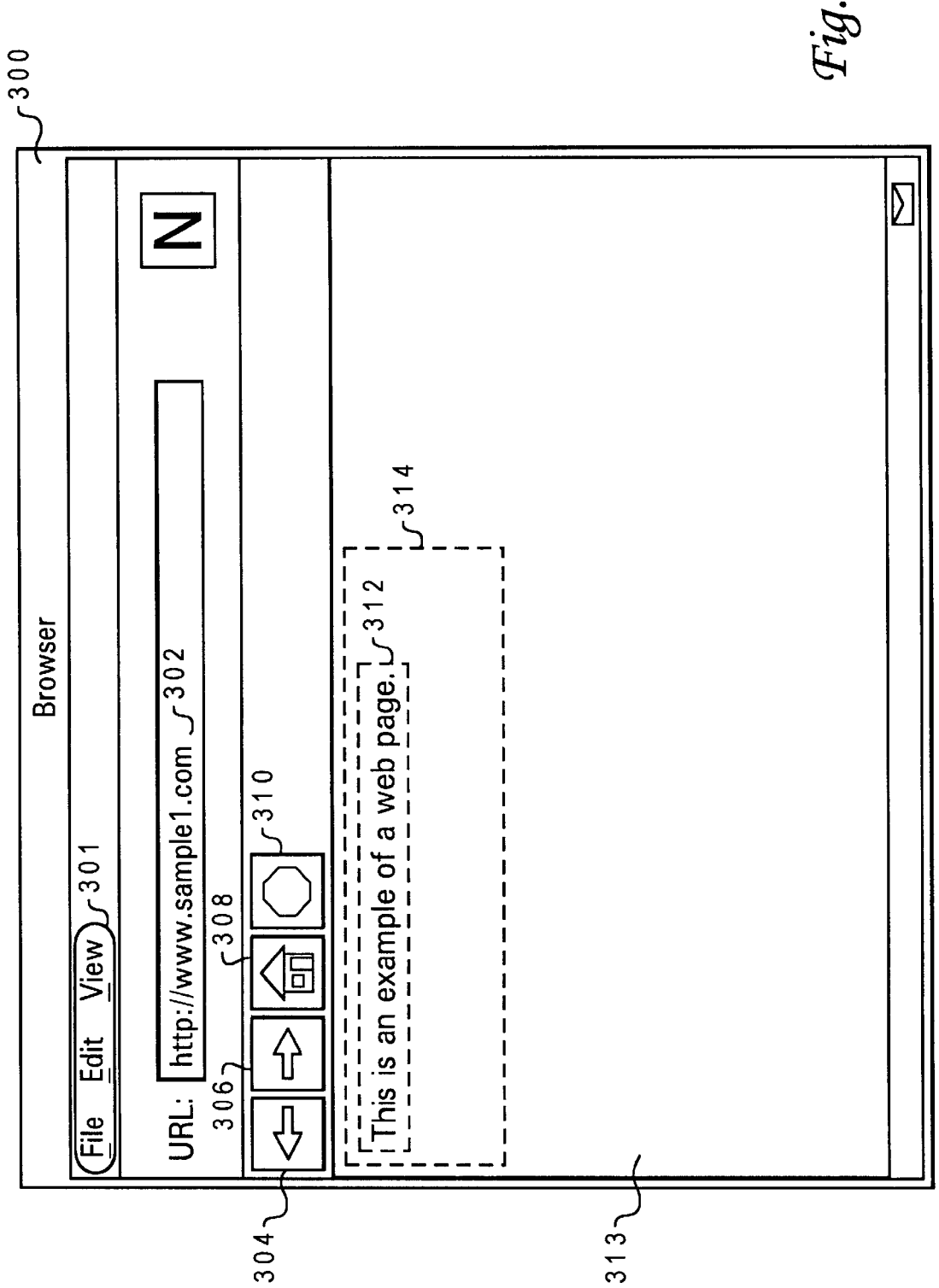
FIG. 9 illustrates a GUI of an Internet browser that includes a remotely stored second electronic document associated with a selected link element in accordance with a preferred embodiment of the present invention.

With reference to FIG. 9, a GUI of an Internet browser 56, herein referred to as "Internet browser interface 300," in accordance with a preferred embodiment of the present invention is illustrated. As depicted, Internet browser interface 300 provides a set of pull-down menus 301, a toolbar containing buttons 304–310, and a number of text fields 302 and 313. As is well-known to those skilled in the art, a user can select pull-down menus 301 or buttons 304–310 utilizing keyboard 28 and mouse 32. Buttons 304, 306, 308, and 310 provide the user with easy access to commonly used functions. Pressing "back" button 304 or "forward" button 306 instructs Internet browser interface 300 to invoke display of another previously viewed electronic document. "Home" button 308 invokes display of a user-defined home page. "Stop" button 310 stops the transfer of an electronic document to data processing system 10. Internet browser interface 300 also includes several fields that can be accessed utilizing keyboard 28 and mouse 32. URL field 302 indicates the storage location of the presently viewed electronic document. Web page field 313 a user-requested electronic document 314. Web page element 312 is an example an element found in the remotely stored second electronic document.

When the recipient selects link element 116 in the first electronic document utilizing mouse 32, electronic document viewer 54 transmits link element 116 to Internet browser 56 and invokes display of Internet browser interface 300, including a remotely stored second electronic document referenced by link element 116.

Figure 10:
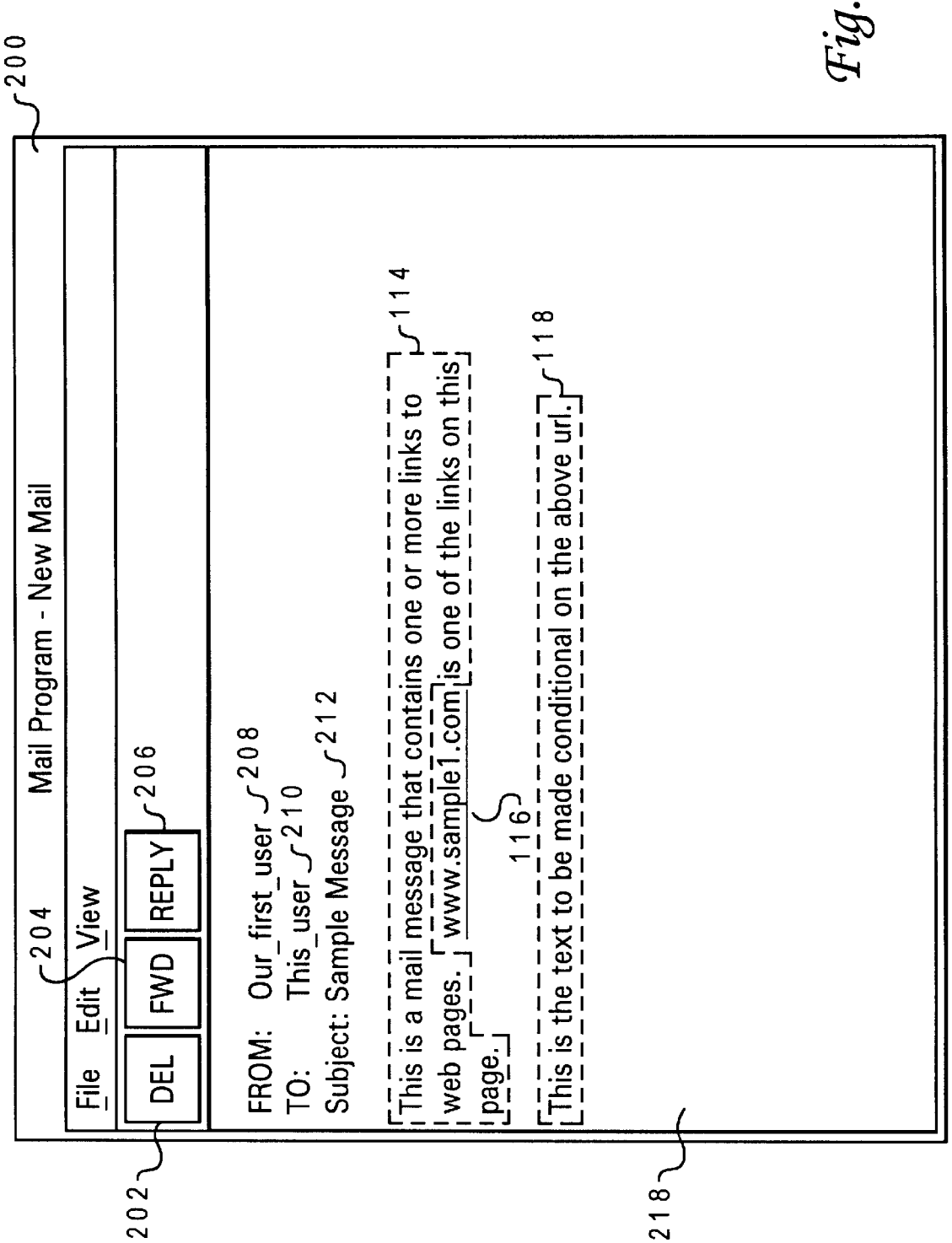
FIG. 10 depicts a GUI of an electronic document viewer, as viewed by the recipient, that includes the display of a conditional element after the recipient invokes display of the remotely stored second electronic document by selecting an associated link element in the first electronic document in accordance with a preferred embodiment of the present invention.

Referring to FIG. 10, there is depicted another view of electronic document viewer interface 200 in which conditional element 118 is displayed. After viewing the remotely stored second electronic document associated with link element 116, conditional element 118 is now viewable by the recipient, as depicted in FIG. 10.

Figure 11:
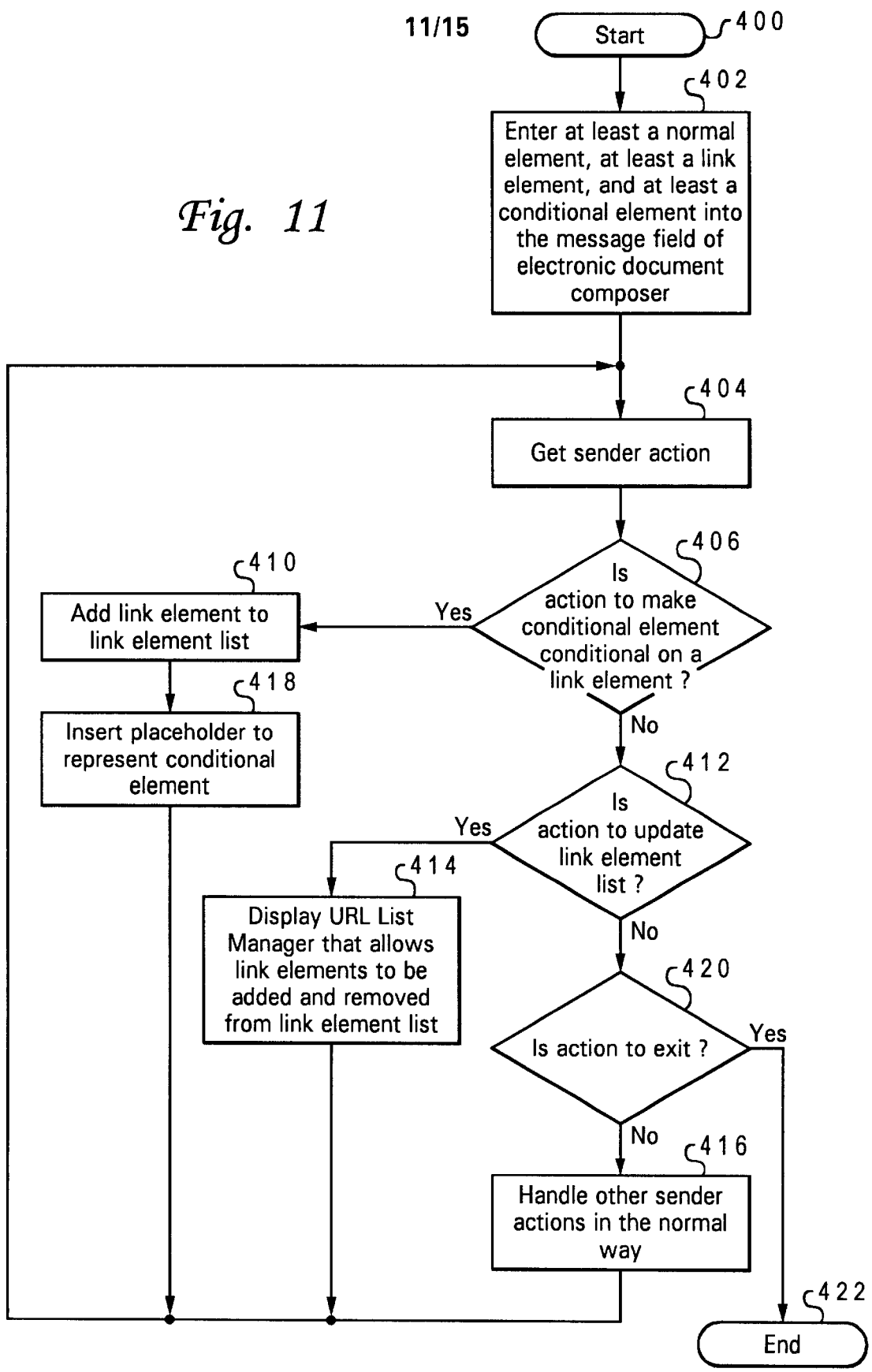
FIG. 11 is a high-level logic flowchart of a first method for constructing an electronic document in accordance with a preferred embodiment of the present invention.

With reference to FIG. 11, there is illustrated a high-level logic flowchart of a method of constructing an electronic document in accordance to a first preferred embodiment of the present invention. The method of constructing an electronic document can be implemented utilizing an electronic document composer 52, which is stored in memory 22 and executable by CPU 21 of data processing system 10.

As depicted, the method begins at block 400 and then continues to block 402, which illustrates the sender building a first electronic document by entering at least a normal element, a link element, and a conditional element in message field 119 of electronic document composer interface 100. Next, the process enters a user input loop including blocks 404, 406, 412, 416, and 420.

As illustrated in block 404, the process waits for a further action by the sender. If the sender action is to select a conditional element and to associate the conditional element with a link element as depicted in block 406, the link element is added, as depicted in block 410, to an associated link element list 131, which lists the link elements in the electronic document that are associated with the conditional element. As noted above, to associate the conditional element with the link element, the sender selects a conditional element with mouse 32, invokes display of dialog box 120 utilizing mouse 32 (e.g., by clicking on the right button on mouse 32) and selects "conditional on URL" option 120*d* in dialog box 120. As depicted at block 412, if the sender action is to update link element list 131 (e.g., invoking display of dialog box 120 and selecting "modify URL list" option 120*e*), the process moves to block 414. Block 414 illustrates the display of URL list manager 124, which allows link elements to be added and removed from associated link element list 131. If a link element is added to associated link element list 131, a placeholder 132 is inserted in message field 119 in place of the conditional element to alert the sender that the conditional element has been associated with a link element 130 listed on link element list 131, as depicted at block 418. Illustrated in block 420, if the sender action is to exit electronic document viewer 54, the process ends, as depicted in block 422.

If, however, the sender action detected at block 404 is not the association of a conditional element with a link element, an update to link element list 131, or an exit of electronic document viewer 54, the process then continues to block 416, where it is depicted that all other sender actions are handled according to the conventional operation of electronic document composer 52.

Figure 12:
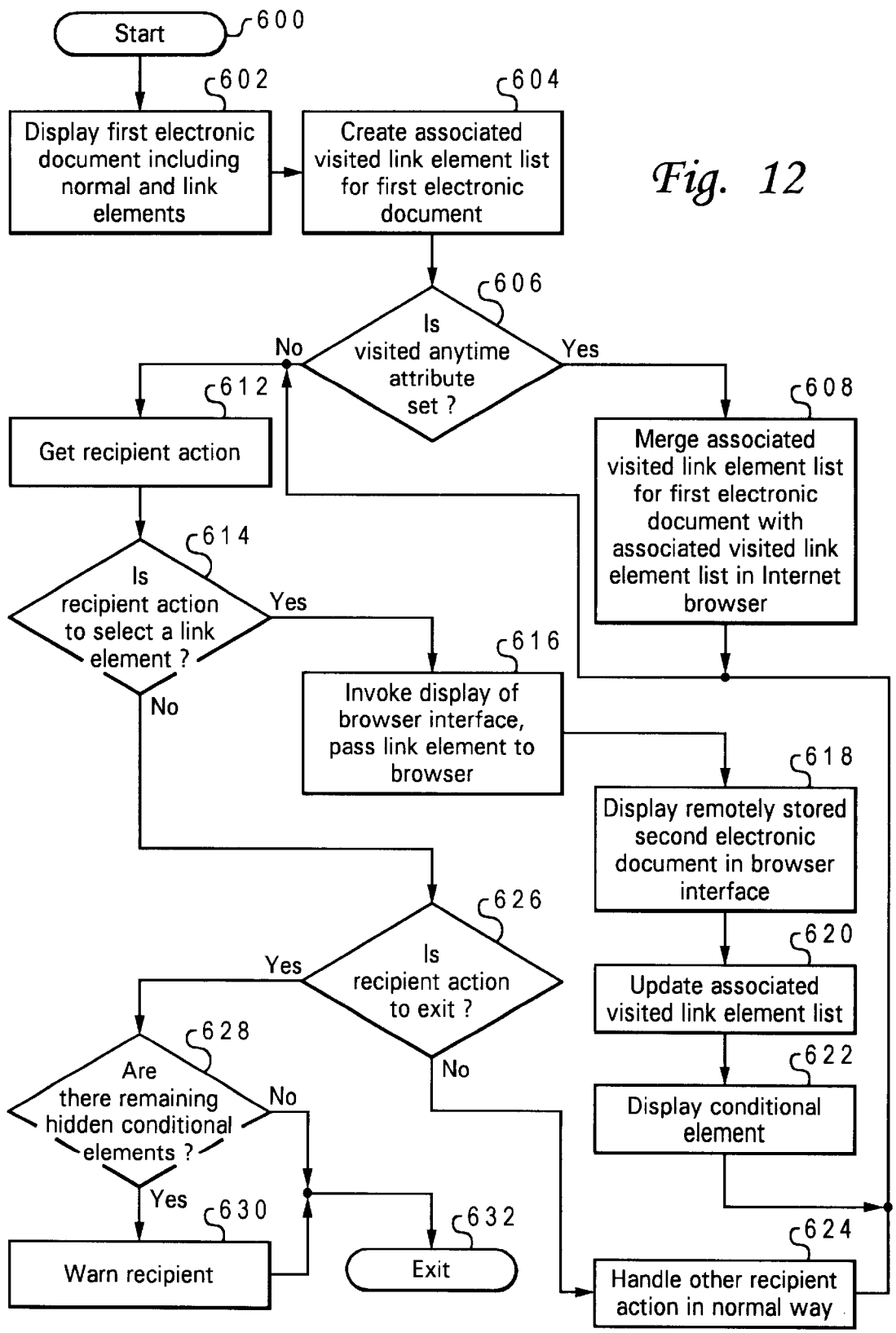
FIG. 12 is a high-level logic flowchart of a first method for structuring the display of an electronic document in accordance with a preferred embodiment of the present invention.

With reference to FIG. 12, a high-level logic flowchart depicting a first preferred method of structuring the display of an electronic document according to the present invention is illustrated. A preferred embodiment of the present invention can implement the electronic document display method utilizing an electronic document viewer 54 stored in memory 22 and executable by CPU 21 of data processing system 10. The preferred method of structuring the display of an electronic document includes three phases. In the first phase, the normal and link elements of the first electronic document are displayed and an associated visited link element list is constructed. The second phase of the preferred method involves determining the status of a "visited anytime" attribute, which determines whether or not conditional elements included in the first electronic document are hidden from the recipient's view each time the recipient invokes display of the first electronic document. The recipient's actions are monitored and implemented in the third and final phase of the preferred method of structuring the display of an electronic document.

In the first phase of the first method of structuring the display of an electronic document, the first electronic document, including normal and link elements, are displayed, as depicted in blocks 600 and 602. An associated visited link element list, utilized for determining which of the remotely stored electronic documents associated with link elements included in the first electronic document have been visited by the recipient, is constructed, as illustrated in block 604. If a link element associated with a conditional element has been selected by the recipient, the conditional element is made viewable to the recipient.

The second phase of the process, as depicted in block 606, involves determining whether or not the visited anytime attribute was set by the sender of the electronic document. If the visited anytime attribute is set, electronic document viewer 54 merges associated visited link element list for the first electronic document with the associated visited link element list (i.e., history list) for Internet browser 56, as illustrated in block 608. Consequently, if the recipient has selected a link element associated with a conditional element in the first electronic document at any time, electronic document viewer 54 will display the conditional element to the recipient.

The third phase of the process monitors actions performed by the recipient, as shown in block 612. If the monitored recipient action is the selection of a link element utilizing mouse 32 to invoke display of the remotely stored second electronic document, the electronic document viewer 54 invokes execution of Internet browser 56 and passes the selected link element to Internet browser 56, as illustrated in block 616. Then, as shown in block 618, Internet browser 56 displays the remotely stored second electronic document, as illustrated in web page field 313 of Internet browser interface 300. The associated visited link element list is updated with the selected link element, as shown in block 620. Then, electronic document viewer 54 displays the conditional element associated with the selected link element, as illustrated at block 622. The process then returns to block 612 from block 622.

If, however, the recipient action received at block 612 is to exit electronic document viewer 54 and not all of the conditional elements have been displayed (blocks 626, 628, and 630), the recipient is preferably warned that the first electronic document contains additional hidden information. The process then ends, as shown in block 632. However, if the recipient's action is not one of the aforementioned actions, all other actions are handled in a conventional manner, as illustrated in block 624. The process then returns from block 624 to block 612.

Figure 13:
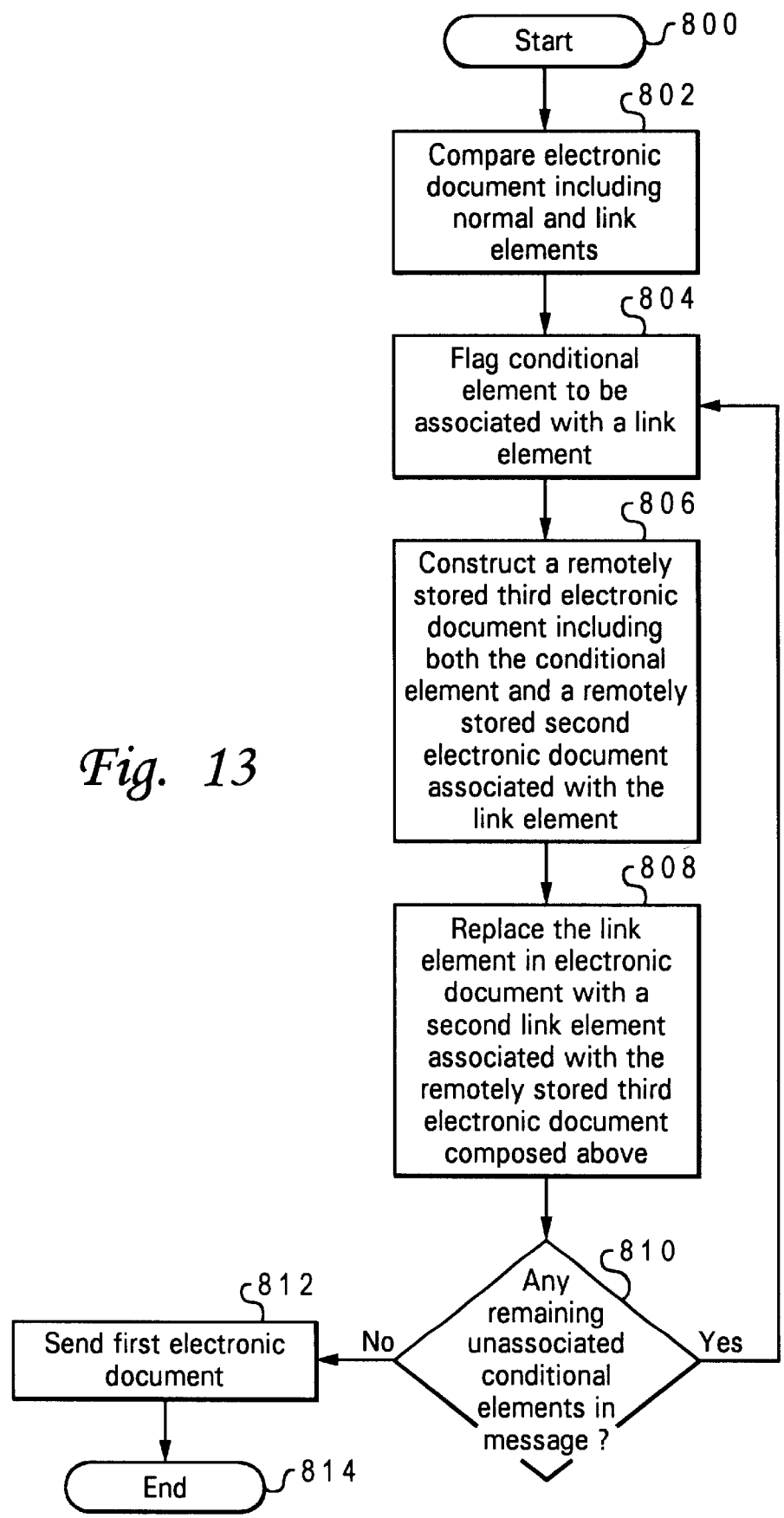
FIG. 13 is a high-level logic flowchart of a second method for constructing a first electronic document in accordance with another preferred embodiment of the present invention.

With reference to FIG. 13, a high-level logic flowchart illustrating a second preferred method of constructing an electronic document according to the present invention is depicted. A preferred embodiment of the present invention can implement the electronic document display method utilizing an electronic document composer 52, stored in memory 22 and executable by CPU 21 of data processing system 10.

The second preferred method of constructing an electronic document results in the construction of a remotely stored third electronic document, viewable by the recipient, which includes both a copy of the conditional element and a copy of the remotely stored second electronic document referenced by the link element in the first electronic document. The remotely stored third electronic document can also be implemented as a web page.

The process begins as illustrated in block 800 and continues to block 802, which depicts the construction of a first electronic document, including at least a normal element, a link element, and a conditional element as described and illustrated. Next, the sender selects a conditional element to be associated with a first link element utilizing mouse 32, as shown in block 804. The first link element is further associated with a remotely stored second electronic document. As depicted in block 806, a remotely stored third electronic document, which includes a copy of the conditional element and a copy of the remotely stored second electronic document, is constructed by the sender utilizing electronic document composer 52 via electronic document composer interface 100. The original conditional element entered by the sender in message field 119 of electronic document composer interface 100 is removed by electronic document composer 52. The first link element associated with the remotely stored second electronic document is replaced in the first electronic document with a second link element associated with the remotely stored third electronic document, as illustrated in block 808. Then, a determination is made whether or not there are any remaining unassigned link elements in the first electronic document, as illustrated in block 810.

If there are remaining unassigned conditional elements in the first electronic document, the process returns from block 810 to block 804, where the sender repeats the process of associating an unassigned conditional element with another link element. However, if there are no more remaining unassigned conditional elements in the first electronic document, the first electronic document is then sent to the intended recipient, as shown in block 812, and, as illustrated in block 814, the process ends.

This second preferred method of constructing an electronic document is favorable when the viewing of the electronic document is to be accomplished utilizing an existing electronic document viewer, unlike the aforementioned first preferred embodiment of the present invention. The conditional elements are not revealed to the recipient in message field 119 of electronic document viewer interface 200, but in a separate remotely stored third electronic document displaying in Internet browser interface 300.

Figure 14:
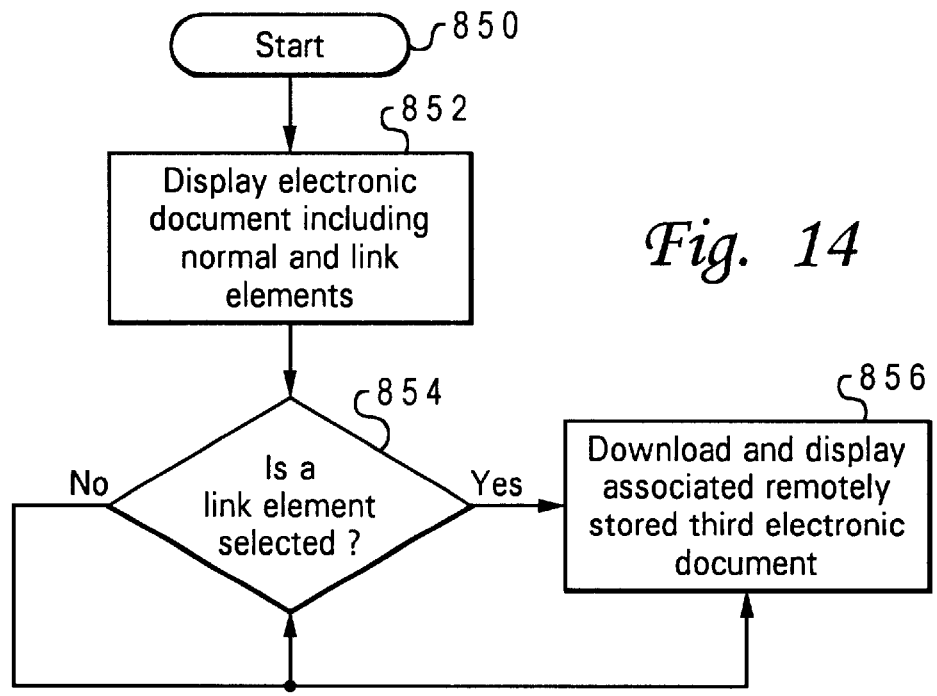
FIG. 14 is a high-level logic flowchart of a second method for viewing a first electronic document in accordance with another preferred embodiment of the present invention.

Referring now to FIG. 14, a high-level logic flowchart depicting a second preferred method of displaying an electronic document according to the present invention is illustrated. A preferred embodiment of the present invention can implement the electronic document display method utilizing data electronic document viewer 200 stored in memory 22 and executable by CPU 21 of data processing system 10.

The second preferred method of structuring display of an electronic document is implemented utilizing a conventional electronic document viewer. The electronic document viewer is not required to hide and reveal conditional elements within message field 119 of electronic document viewer interface 200. The existing electronic document viewer can simply invoke display, utilizing a conventional Internet browser, of a temporary remotely stored third electronic document that includes the conditional element.

The process begins at block 850, and passes to block 852, which illustrates that an electronic document viewer displays the first electronic document, which includes at least one normal element and at least one link element. Then, the electronic document viewer determines whether or not the link element associated with a remotely stored second electronic document is selected, as shown in block 854.

If the link element is selected by the recipient utilizing mouse 32, the remotely stored third electronic document containing a copy of the conditional element and a copy of the remotely stored second electronic document is downloaded from a remote location, as depicted in block 856. Then, the process thereafter returns from block 856 to block 854, where the recipient's actions are monitored for a selection of another link element.

Figure 15:
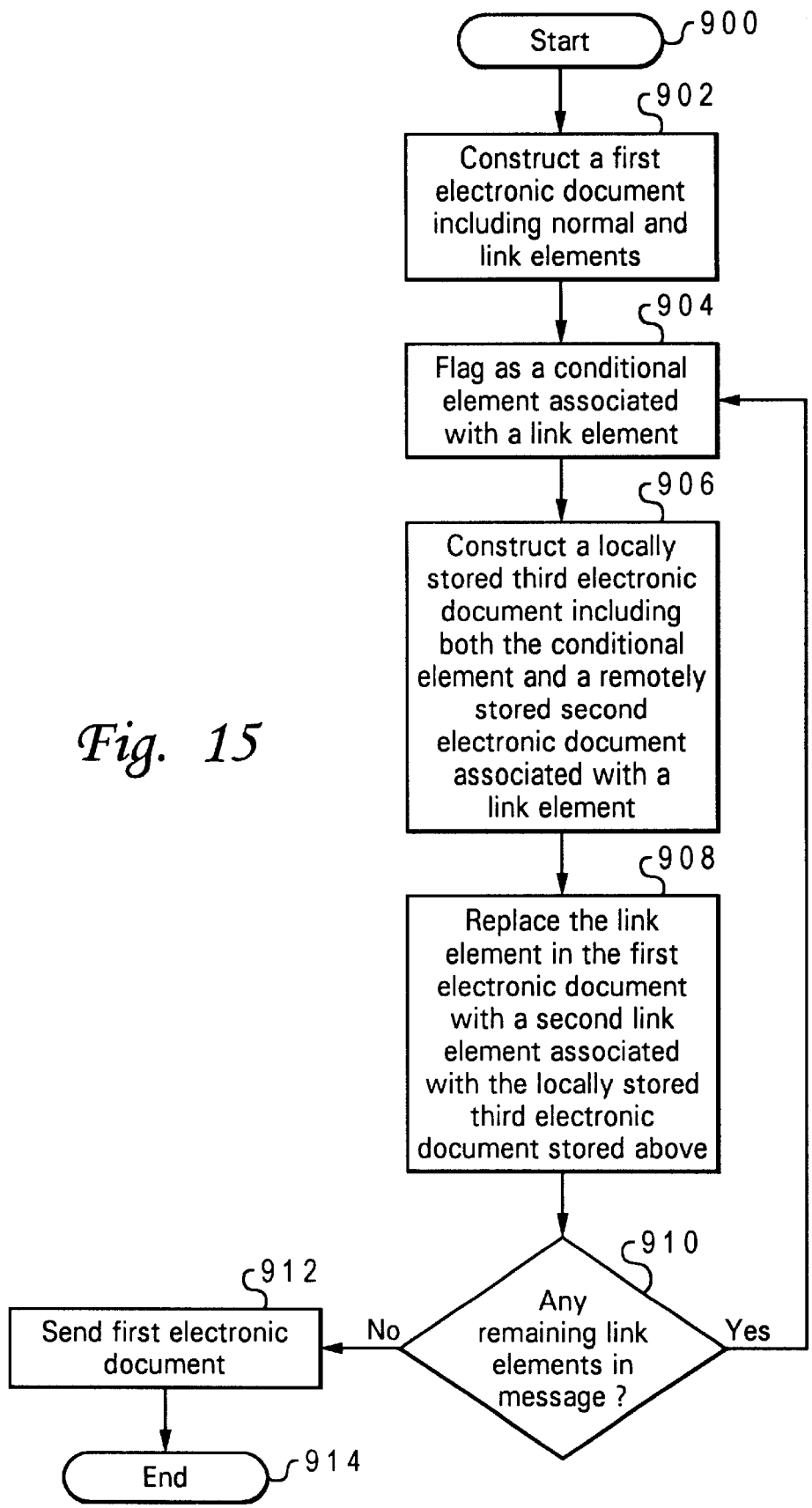
FIG. 15 is a high-level logic flowchart of a third method for constructing a first electronic document in accordance with another preferred embodiment of the present invention.

With reference to FIG. 15, a high-level logic flowchart illustrating a third preferred method of constructing an electronic document according to the present invention is depicted. A preferred embodiment of the present invention can implement the electronic document display method utilizing an electronic document composer 52, stored in memory 22 and executable by CPU 21 of data processing system 10.

The third preferred method of constructing an electronic document results in the construction of a third electronic document stored in the same data processing system, viewable by the recipient, which includes both a copy of the conditional element and a copy of the remotely stored second electronic document referenced by the link element in the first electronic document. The third electronic document can also be implemented as a web page.

The process begins as illustrated in block 900 and continues to block 902, which depicts the construction of a first electronic document, including at least a normal element, a link element, and a conditional element as described and illustrated. Next, the sender selects a conditional element to be associated with a first link element utilizing mouse 32, as shown in block 904. The first link element is further associated with a remotely stored second electronic document. As depicted in block 906, a third electronic document, which includes a copy of the conditional element and a copy of the remotely stored second electronic document, is constructed by the sender utilizing electronic document composer 52 via electronic document composer interface 100. The original conditional element entered by the sender in message field 119 of electronic document composer interface 100 is removed by electronic document composer 52. The first link element associated with the remotely stored second electronic document is replaced in the first electronic document with a second link element associated with the third electronic document, as illustrated in block 908. Then, a determination is made whether or not there are any remaining unassigned link elements in the first electronic document, as illustrated in block 910.

If there are remaining unassigned conditional elements in the first electronic document, the process returns from block 910 to block 904, where the sender repeats the process of associating an unassigned conditional element to another link element. However, if there are no more remaining unassigned conditional elements in the first electronic document, the first electronic document is then sent to the intended recipient, as shown in block 912, and, as illustrated in block 914, the process ends.

This third preferred method of constructing an electronic document is favorable when the electronic document is to be viewed utilizing a conventional electronic document viewer, unlike the aforementioned first preferred embodiment of the present invention. The conditional elements are not revealed to the recipient in message field 119 of electronic document viewer interface 200. Instead, the conditional elements are displayed in Internet browser interface 300 in a separate third electronic document stored locally with respect to the recipient.

Figure 16:
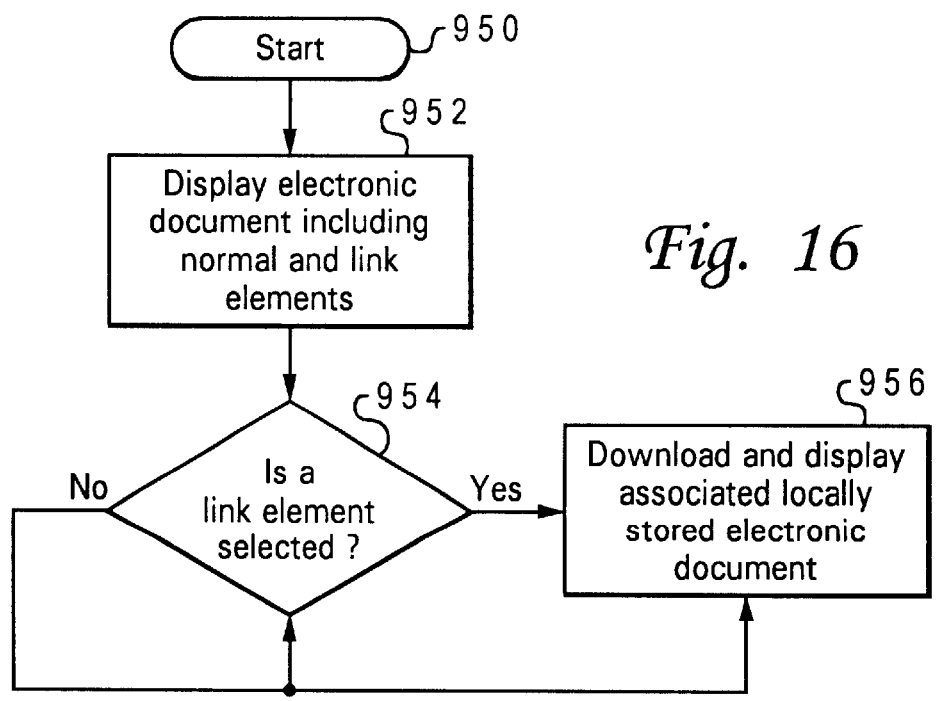
FIG. 16 is a high-level logic flowchart of a third method for viewing a first electronic document in accordance with another preferred embodiment of the present invention.

Referring now to FIG. 16, a high-level logic flowchart depicting a third preferred method of structuring display of an electronic document according to the present invention is illustrated. A preferred embodiment of the present invention can implement the electronic document display method utilizing data electronic document viewer 54 stored in memory 22 and executable by CPU 21 of data processing system 10.

The third preferred method of structuring display of an electronic document is implemented utilizing a conventional electronic document viewer. The electronic document viewer is not required to hide and reveal conditional elements within message field 119 of electronic document viewer interface 200. The existing electronic document viewer can simply invoke display, utilizing a conventional Internet browser, of a third electronic document that includes the conditional element.

The process begins at block 950 and passes to block 952, which illustrates an electronic document viewer displaying the first electronic document, which includes at least a normal element and a link element. Then, the electronic document viewer determines whether or not the link element associated with a remotely stored second electronic document is selected, as shown in block 954.

If the link element is selected by the recipient utilizing mouse 32, a third electronic document containing a copy of the conditional element and a copy of the remotely stored second electronic document is downloaded from a local storage location with respect to the recipient and displayed by electronic document viewer interface 200, as depicted in block 956. Then, the process thereafter returns from block 956 to block 954, where the recipient's actions are monitored for a selection of another link element.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:
   an interconnect;
   a processor, coupled to said interconnect;
   a memory, coupled to said interconnect; and
   an electronic document viewer stored in said memory and executable by said processor, wherein said electronic document viewer is utilized to view a first electronic document including at least a normal element, a conditional element, and a link element associated with a remotely stored second electronic document, wherein said electronic document viewer presents said first electronic document to a recipient in an order defined by a sender by displaying only said normal element and said link element when said recipient initially invokes display of said first electronic document, wherein said conditional element is hidden from view until said recipient selects said link element to invoke display of said remotely stored second electronic document and is thereafter displayed by said electronic document viewer within said first electronic document separately from said second electronic document.

2. The data processing system according to claim 1, wherein said first electronic document is an electronic mail message.

3. The data processing system according to claim 1, further including an Internet browser, wherein said electronic document viewer displays said first electronic document and utilizes said Internet browser for retrieving and displaying said remotely stored second electronic document.

4. The data processing system according to claim 1, wherein said remotely stored second electronic document comprises a web page.

5. The data processing system according to claim 1, further comprising:
   an electronic document composer stored in said memory and executable by said processor, to construct said first electronic document.

6. A method of viewing an electronic document utilizing a data processing system, said method comprising:
   presenting a first electronic document including at least a normal element, a link element associated with a remotely stored second electronic document, and a conditional element to a recipient in an order defined by a sender by displaying only said normal element and said link element when said recipient initially invokes display of said first electronic document;
   hiding said conditional element from view until said recipient selects said link element to invoke display of said remotely stored second electronic document; and
   thereafter, displaying said conditional element within said first electronic document separately from said second electronic document.

7. The method of viewing an electronic document according to claim 6, further comprising:

assembling a first associated visited link element list for said first electronic document for indicating whether or not specific link elements in said first electronic document have been selected; determining whether or not a visited anytime attribute is set; and
merging said first associated visited link element list with a second associated visited link element list associated with an Internet browser and forming a master associated visited link element list, in response to determining said visited anytime attribute is set.

8. The method of viewing an electronic document according to claim 7, said method further including:
   updating said first associated visited link element list by indicating that said recipient has selected said link element, in response to said recipient selecting said link element and in response to determining that said visited anytime is not set.

9. The method of viewing an electronic document according to claim 7, said method further comprising:
   updating said master associated visited link element list indicating that said recipient has selected said link element, in response to said recipient selecting said link element and in response to determining that said visited anytime is not set.

10. The method of viewing an electronic document according to claim 7, said step of presenting further including:
    displaying said remotely stored second electronic document in an Internet browser.

11. A computer program product comprising:
    a computer-usable medium; and
    an electronic document viewer encoded within said computer-usable medium, wherein said electronic document viewer causes a computer to present a first electronic document including at least a normal element, at least a link element, and at least a conditional element, to a recipient in an order defined by a sender by displaying only said normal element and said link element when said recipient initially invokes display of said first electronic document, wherein said conditional element is hidden from view within said first electronic document until the recipient selects said link element to invoke display of said remotely stored second electronic document and is thereafter displayed by the electronic document viewer within the first electronic document separately from said second electronic document.

12. A data processing system, comprising:
    an interconnect;
    a processor, coupled to said interconnect;
    a memory, coupled to said interconnect; and
    an electronic document composer stored in said memory and executable by said processor, wherein said electronic document composer constructs a first electronic document including at least a normal element, a conditional element, and a link element associated with a remotely stored second electronic document and wherein said electronic document composer associates said conditional element with said link element such that when a recipient initially invokes display of said first electronic document, said conditional element is hidden from view until said recipient selects said link element to invoke display of said remotely stored second electronic document and is thereafter displayed within said first electronic document separately from said second electronic document.

13. The data processing system according to claim 12, wherein said first electronic document is an electronic mail message.

14. The data processing system according to claim 12, wherein said remotely stored second electronic document comprises a web page.

15. The data processing system according to claim 12, further comprising:
an electronic document viewer stored in said memory and executable by said processor, to view said first electronic document.

16. A method of constructing an electronic document utilizing a data processing system, said method comprising:
entering into a first electronic document at least a normal element, a link element associated with a remotely stored second electronic document, and a conditional element; and
associating said conditional element with said link element such that when said first electronic document is displayed said conditional element is hidden from view within said first electronic document until a recipient selects said link element to invoke display of said remotely stored second electronic document and is thereafter displayed within said first electronic document separately from said second electronic document.

17. The method of constructing an electronic document utilizing a data processing system according to claim 16, wherein said step of entering comprises entering an electronic mail message.

18. The method of constructing an electronic document according to claim 16, wherein said link element is a uniform resource locator (URL).

19. A computer program product comprising:
a computer-usable medium; and
an electronic document composer encoded within said computer-usable medium, wherein said electronic document composer includes:
means for entering into a first electronic document at least one normal element, at least one link element associated with a remotely stored second electronic document, and at least one conditional element; and
means for associating said conditional element and said link element such that when said first electronic document is displayed said conditional element is hidden from view until a recipient selects said link element to invoke display of said remotely stored second electronic document and is thereafter displayed within said first electronic document.

20. A data processing system, comprising:
an interconnect;
a processor coupled to said interconnect;
a memory coupled to said interconnect; and
an electronic document composer stored in said memory and executable by said processor, wherein said electronic document composer includes:
means, responsive to user input, for constructing a first electronic document including at least a normal element, a conditional element, and a link element associated with a remotely stored second electronic document;
means for permitting a user to associate said conditional element with said link element such that, when a recipient initially invokes display of said first electronic document, said conditional element is hidden from view until said recipient selects said link element to invoke display of said remotely stored second electronic document and said conditional element is thereafter displayed; and
means, responsive to user association of said conditional element and said link element, for constructing a third electronic document including a copy of said conditional element and a copy of said remotely stored second electronic document and for replacing said link element in said first electronic document with a second link element associated with said third electronic document.

21. A method of constructing an electronic document supporting sequenced presentation of information, said method comprising:
in response to user input, constructing a first electronic document including at least a normal element, a conditional element, and a link element associated with a remotely stored second electronic document;
permitting a user to associate said conditional element with said link element such that, when a recipient initially invokes display of said first electronic document, said conditional element is hidden from view until said recipient selects said link element to invoke display of said remotely stored second electronic document and said conditional element is thereafter displayed; and
in response to user association of said conditional element and said link element, constructing a third electronic document including a copy of said conditional element and a copy of said remotely stored second electronic document and for replacing said link element in said first electronic document with a second link element associated with said third electronic document.

22. A program product, comprising:
a computer-usable medium; and
an electronic document composer stored in said computer-usable medium and executable by a computer, wherein said electronic document composer includes:
means, responsive to user input, for constructing a first electronic document including at least a normal element, a conditional element, and a link element associated with a remotely stored second electronic document;
means for permitting a user to associate said conditional element with said link element such that, when a recipient initially invokes display of said first electronic document, said conditional element is hidden from view until said recipient selects said link element to invoke display of said remotely stored second electronic document and said conditional element is thereafter displayed; and
means, responsive to user association of said conditional element and said link element, for constructing a third electronic document including a copy of said conditional element and a copy of said remotely stored second electronic document and for replacing said link element in said first electronic document with a second link element associated with said third electronic document.

* * * * *